(12) United States Patent
Ragan, Jr.

(10) Patent No.: US 11,182,073 B2
(45) Date of Patent: Nov. 23, 2021

(54) SELECTION ON USER INTERFACE BASED ON CURSOR GESTURES

(71) Applicant: International Business Machines Corporation, Armonk, NY (US)

(72) Inventor: Richard W. Ragan, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/202,969

(22) Filed: Nov. 28, 2018

(65) Prior Publication Data

US 2020/0167058 A1 May 28, 2020

(51) Int. Cl.
| | |
|---|---|
| *G06F 3/0489* | (2013.01) |
| *G06F 3/0481* | (2013.01) |
| *G06F 3/0488* | (2013.01) |
| *G06F 3/0354* | (2013.01) |
| *G06F 3/0362* | (2013.01) |
| *G06F 3/0484* | (2013.01) |
| *G06F 3/0482* | (2013.01) |

(52) U.S. Cl.
CPC ........ *G06F 3/04892* (2013.01); *G06F 3/0362* (2013.01); *G06F 3/03543* (2013.01); *G06F 3/04812* (2013.01); *G06F 3/04842* (2013.01); *G06F 3/04883* (2013.01); *G06F 3/0482* (2013.01)

(58) Field of Classification Search
CPC .. G06F 3/0486; G06F 3/0482; G06F 3/04812; G06F 2203/04801; G06F 3/048; G06F 3/03543; G06F 3/04883; G06F 3/04842
See application file for complete search history.

(56) References Cited

U.S. PATENT DOCUMENTS 5,327,528 A * 7/1994 Hidaka ............... G06F 3/04842
345/642
5,598,524 A * 1/1997 Johnston, Jr. ......... G06F 3/0486
715/769

(Continued)

FOREIGN PATENT DOCUMENTS

| EP | 2817695 | 3/2018 | |
|---|---|---|---|
| WO | WO-2015058443 A1 * | 4/2015 | ......... G06F 3/04842 |
| WO | WO2015081913 | 6/2015 | |

OTHER PUBLICATIONS

Microsoft® Computer Dictionary 176 (5th Ed. 2002) (Year: 2002).*

(Continued)

*Primary Examiner* — Justin R. Blaufeld
(74) *Attorney, Agent, or Firm* — Schmeiser, Olsen & Watts, LLP; Michael A. Petrocelli

(57) ABSTRACT

A system and method for selecting distant actions on a user interface using cursor gestures includes calculating a trajectory path of a cursor digitally represented on the display screen, using a direction of the cursor, in response to receiving cursor motion towards distant action as first input from the input mechanism. At least a portion of an action object that intersects the trajectory path of the cursor is detected as a result of a second input of the input mechanism. The user interface is augmented by presenting an action menu proximate the cursor as a function of the detecting, the action menu including one or more actions associated with the action object.

13 Claims, 15 Drawing Sheets

(56) References Cited

U.S. PATENT DOCUMENTS

| | | | | |
|---|---|---|---|---|
| 5,790,820 | A * | 8/1998 | Vayda | G06F 3/0482 715/834 |
| 5,793,377 | A * | 8/1998 | Moore | G06F 3/04845 345/419 |
| 6,031,521 | A * | 2/2000 | Luzzatto | G06F 3/03543 345/157 |
| 6,362,842 | B1 * | 3/2002 | Tahara | G06F 3/04812 715/705 |
| 6,587,131 | B1 * | 7/2003 | Nakai | G06F 3/04812 715/857 |
| 7,506,275 | B2 * | 3/2009 | Conradt | G06F 3/0481 715/834 |
| 7,913,188 | B1 * | 3/2011 | Krenz | G08G 5/0021 715/834 |
| 9,547,437 | B2 | 1/2017 | Fino | |
| 9,552,075 | B2 | 1/2017 | Holz | |
| 9,659,279 | B2 | 5/2017 | Saund et al. | |
| 2002/0047845 | A1 * | 4/2002 | Brett | G05B 19/00 345/441 |
| 2003/0038797 | A1 * | 2/2003 | Vazzana | G06T 19/20 345/419 |
| 2004/0230918 | A1 * | 11/2004 | Maruyama | G06F 3/04842 715/856 |
| 2005/0083300 | A1 * | 4/2005 | Castle | G06F 3/04812 345/157 |
| 2006/0026537 | A1 * | 2/2006 | L'Heureux | G06F 3/04892 715/863 |
| 2006/0114224 | A1 * | 6/2006 | Ninomiya | G06F 3/04892 345/157 |
| 2007/0180392 | A1 * | 8/2007 | Russo | G06F 3/0482 715/765 |
| 2007/0250793 | A1 * | 10/2007 | Miura | G06F 3/04812 715/810 |
| 2009/0100383 | A1 | 4/2009 | Sunday et al. | |
| 2009/0113330 | A1 * | 4/2009 | Garrison | G06F 3/0486 715/769 |
| 2015/0324001 | A1 | 11/2015 | Yanai et al. | |
| 2018/0047103 | A1 * | 2/2018 | Buck | G06Q 40/04 |

OTHER PUBLICATIONS

Wilbert O. Galitz, The Essential Guide to User Interface Design 394 (2nd Ed. 2002) (Year: 2002).*

Mell, Peter et al.; "The NIST Definition of Cloud Computing;" National Institute of Standards and Technology; Special Publication 800-145; Sep. 2011; 7 pages.

* cited by examiner

FIG. 2

| Transaction ID | Status | Amount Due | Delivery Date | Due in | Account Name |
|---|---|---|---|---|---|
| 36547438 | Open | $23,475 | MM/YYYY | 5 | Healthcare |
| 65758493 | Open | $142,856 | MM/YYYY | -6 | Healthcare |
| 47458303 | Disputed | $6,607 | MM/YYYY | -17 | Healthcare |
| 85633520 | Open | $1,675,573 | MM/YYYY | 2 | Healthcare |
| 25449733 | Disputed | $220,576 | MM/YYYY | -4 | Healthcare |
| 07487193 | Open | $78,876 | MM/YYYY | 21 | Healthcare |

My Account

220a

220b — View All Invoices
220c — Download
220d — Open

Find
Type...
Open Disputes: All
Overdue Day(s): All
Location: All 230
250
110

FIG. 4

| Transaction ID | Status | Amount Due | Delivery Date | Due Days | Account Name |
|---|---|---|---|---|---|
| 36547438 | Open | $23,475 | MM/YYYY | 0 | Healthcare |
| 65758493 | Open | $142,856 | MM/YYYY | -6 | Healthcare |
| 47458303 | Disputed | $6,607 | MM/YYYY | -17 | Healthcare |
| 85633520 | Open | $1,675,573 | MM/YYYY | 2 | Healthcare |
| 25449733 | Disputed | $220,576 | MM/YYYY | -4 | Healthcare |
| 07487193 | Open | $78,876 | MM/YYYY | 21 | Healthcare |

My Account

220a

View All Invoices — 220b
Download — 220c
Open — 220d

Find
Type...
Open Disputes   All
Overdue Day(s)  All
Location        All

235'
230
250
110

US 11,182,073 B2

SELECTION ON USER INTERFACE BASED ON CURSOR GESTURES

TECHNICAL FIELD

The present invention relates to systems and methods for selecting user interface actions, and more specifically the embodiments of an action selection system for selecting actions distant from the cursor using cursor gestures.

BACKGROUND

For large-screen tables, laptops, and desktops, the distance a cursor must travel has become a concern for those trying to squeeze as much responsiveness out of personal computing devices as possible. Given the option, users prefer to move a mouse or fingers as short a distance, over a user interface screen, as possible. Even on large tablets the amount of finger movement can be perceived as vexing.

SUMMARY

An embodiment of the present invention relates to a method, and associated computer system and computer program product for selecting actions of a user interface using cursor gestures. The actions, e.g., pushbutton, menu, and other actions, would appear proximal to the cursor to avoid having to move the cursor across the screen to select the action. A processor of a computing system calculates a trajectory path of a cursor digitally represented on a display screen, in response to receiving a first input from the input mechanism. It is determined that at least a portion of an action-object (such as a menu, pushbutton, or icon) intersects the trajectory path of the cursor as a result of a second input of the input mechanism. The user interface is augmented by presenting an action menu proximate the cursor as a function of the detecting, the action menu including one or more actions associated with the action object.

BRIEF DESCRIPTION OF THE DRAWINGS

FIG. 2 depicts a display screen displaying a user interface, in accordance with embodiments of the present invention.

FIG. 4 depicts an action object detected in the calculated trajectory path as it points to the pushbutton ("Download"), in accordance with embodiments of the present invention.

DETAILED DESCRIPTION

Figure 1:
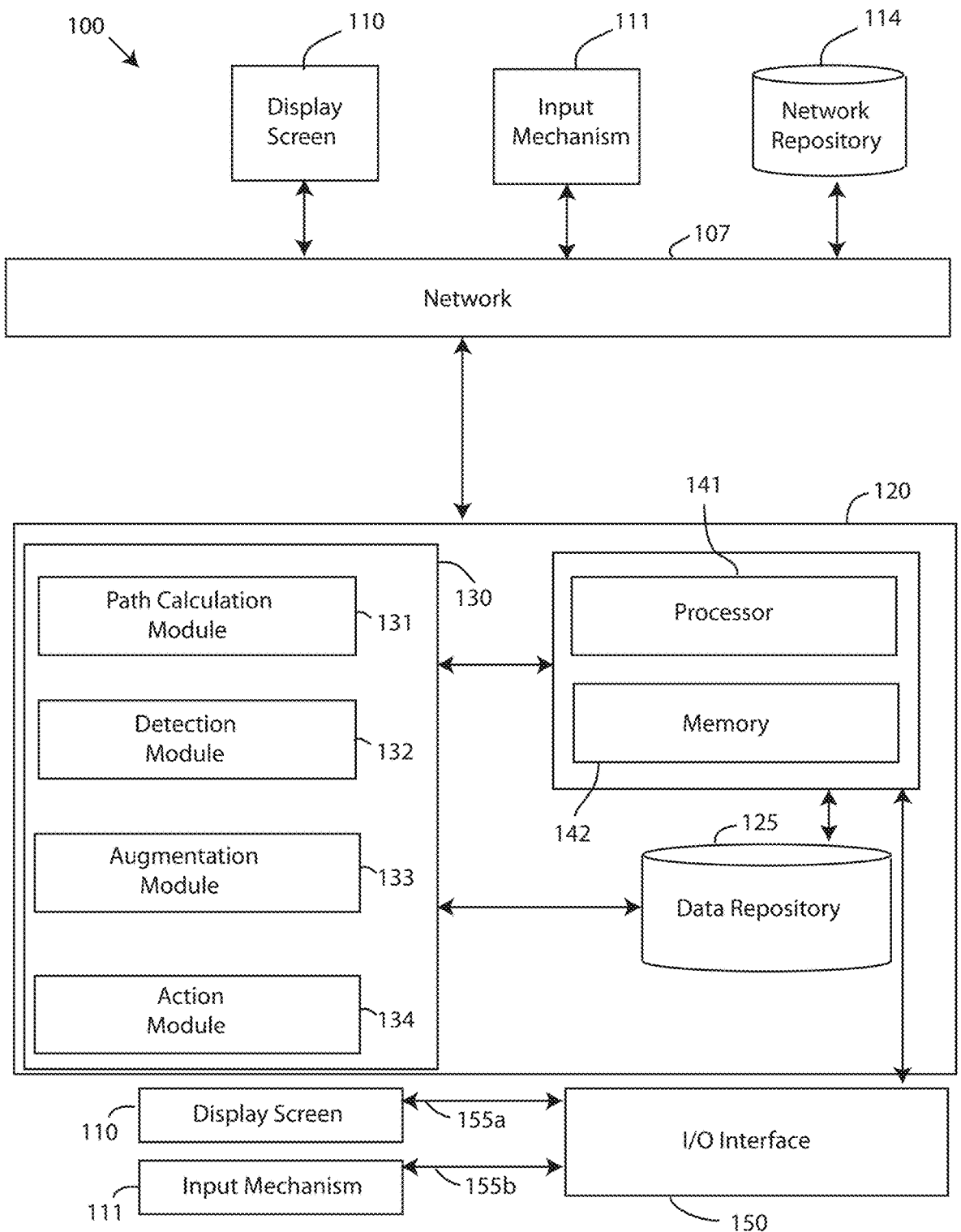
FIG. 1 depicts a block diagram of an action selection system, in accordance with embodiments of the present invention.

Referring to the drawings, FIG. 1 depicts a block diagram of an action selection system 100, in accordance with embodiments of the present invention. The action selection system 100 is a system for selection action-icons of a user interface (UI) using cursor gestures. Using cursor gestures as described herein shortens a travel time of an input mechanism and reduces a physical path required by the input mechanism to select the action icon displayed in the UI. The action selection system 100 may be useful for controlling or selecting actions icons that are remote and distance from the cursor on a display screen. Embodiments of the action selection system 100 may be alternatively referred to a cursor gesture system, a prescient mouse system, a UI navigation system, an action icon or action menu or pushbutton controlling system, and the like.

The action selection system 100 includes a computing system 120. Embodiments of the computing system 120 include a computer system, a computer, a server, one or more servers, a backend computing system, a desktop computing device, a laptop, a tablet computer, large screen computing device, smart TV, and the like. In a first exemplary embodiment, the computing system 120 is a personal computing device, such as a desktop computer, that is locally coupled to a display screen displaying the UI and various software applications. In a second exemplary embodiment, the computing system 120 is a remote server servicing a local machine having a display screen displaying the UI and various software applications.

Furthermore, the action selection system 100 includes a display screen 110 and an input mechanism 111 that are communicatively coupled to the computing system 120 over a network 107. For instance, information/data is transmitted to and/or received from the display screen 110 and the input mechanism 111 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the user preferences, user activity, path trajectory angles, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the user preferences, user activity, path trajectory angles, etc., and the like, to generate both historical and predictive reports regarding a particular user or a particular user rules or settings regarding adjustments of trajectory paths. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing, the network-accessible knowledge bases 114. In an alternative embodiment, the network-accessible knowledge bases 114 are a local repository that is connected to the computing system 120.

Alternatively, the display screen 110 and/or the input mechanism 111 are communicatively coupled to the computing system 120 via an I/O interface 150. For instance, the display screen 110 and the input mechanism 111 are connected via the I/O interface 150 to computer system 120. The display screen 110 and the input mechanism 111 transmit data to the computing system 120 by connecting to computing system 120 via data bus lines 155a, 155b, respectively, to the I/O interface 150. The I/O interface 150 refers to any communication process performed between the computer system 120 and the environment outside of the computer system 120, for example, the display screen 110 and the input mechanism 111. Input to the computing system 120 refers to the signals or instructions sent to the computing system 120, while output refers to the signals sent out from the computer system 120 to the display screen 110 and the input mechanism 111.

The display screen 110 is a hardware device that is configured to display information as one or more graphics. For instance, the display screen 110 is an output device that is configured to display a UI of one or more software applications and operating system. The display screen 110 includes a display, circuitry, and a power device. Examples of the display screen 110 include a computer monitor, a screen, a television screen, a display, and the like. The display screen 110 can include various constructions, size, display types (e.g. light emitting diode (LED), thin film transistor liquid crystal display (TFT-LCD), liquid crystal display (LCD), organic LED, etc.). In an exemplary embodiment, the display screen 110 is a computer monitor of a desktop computer. In another exemplary embodiment, the display screen 110 is a display of a tablet computer. In another exemplary embodiment, the display screen 110 is a television monitor.

The input mechanism 111 is a hardware device configured to provide input to the computing system 120. The input mechanism 111 provides input for controlling a cursor digitally represented on the display screen 110. The cursor is a representation on the display screen 110 that a user controls via the input mechanism 111. For instance, the input mechanism 111 can be used to move a cursor from point-to-point on the display screen 110 to select or otherwise control an action of the UI. The action of the UI is an action (e.g. send, close, quit, etc.) that can be taken by the user as a result of selecting, clicking, controlling, etc. an action object associated with the action. The action object is anything in an application that can be acted upon to effectuate an action within the application. In an exemplary embodiment, the action object is a graphical selectable icon displayed by the UI. In another exemplary embodiments, the action object is a selectable row in a table, a pushbutton, a hyperlink, an action menu, and the like. Moreover, the input mechanism 111 can be a peripheral device, such as a mouse, pointing device, controller device, and the like, which allows a user to control the cursor on the display screen 110. By way of example, a user can physical move the mouse in a left direction which causes the cursor to likewise move in a left direction. The input mechanism 111 can also be a touch-sensitive screen of a display screen 110. The touch-sensitive screen permits users to manipulate a cursor displayed on the display screen with the user's fingers. As the user touches or makes swiping gestures along the touch-sensitive screen (e.g. touchscreen), input is sent to the computing system 120 for manipulating a cursor, objects, and the like within the UI.

Referring back to FIG. 1, the computing system 120 of the action selection system 100 is equipped with a memory device 142 which stores various data/information/code, and a processor 141 for implementing the tasks associated with the action selection system 100. An action selection application 130 is loaded in the memory device 142 of the computing system 120. The action selection application 130 can be an interface, an application, a program, a module, or a combination of modules. In an exemplary embodiment, the action selection application 130 is a software application running on one or more back end servers (e.g. computing system 120), servicing the display screen 110. In other embodiments, the action selection application 130 is a software application running on a personal computing device coupled to the display screen 110.

The action selection application 130 of the computing system 120 includes a path calculation module 131, a detection module 132, an augmentation module 133, and an action module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The path calculation module 131 includes one or more components of hardware and/or software program code for calculating a trajectory path of a cursor digitally represented on a display screen, in response to receiving a first input from the input mechanism. The trajectory path of the cursor is a predicted or projected path measured from the cursor or from proximate the cursor. The calculation module 131 calculates the trajectory path using a current position of the cursor on the display screen 110 as well as the movement of the cursor creating a vector indicating the future direction of the cursor. Based on the cursor's direction and the current position, the calculation module 131 calculates a trajectory of the cursor if the cursor was moved or progressed at the desired angle. The trajectory path can be configured to extend in any direction at a given time. For example, the trajectory path extends up and to the left from the cursor, up and to the right from the cursor, down and to the left from the cursor, and down and to the right from the cursor. The trajectory path can also be calculated to extend directly above or below the cursor. In an exemplary embodiment, the calculation module 131 calculates a single trajectory path associated with the cursor. The desired angle can be any angle from 0° to 360° (e.g. 0° to 180° and 0° to −180°).

Moreover, the calculation module 131 calculates the trajectory path in response to a first input from the input mechanism 111. For instance, the calculation module 131 initiates the calculation of the trajectory path in response to receiving the input signal(s) from the input mechanism 111. The input from the input mechanism 111 is sent to the computing system 120 in response to a user operating the input mechanism 111, such as pressing a button on the input mechanism 111 or touching the input mechanism 111. By way of example, when the user drags a finger on a touchscreen or the user presses and holds a mouse button (e.g. left button), the calculation module 131 notes the direction and position of the cursor, and calculates the trajectory path based on the direction of the cursor. Additionally, the calculation module 131 maps the display screen 110 and/or UI to obtain locations of action objects on the display screen 110. The mapping is associated with an operating system of the computing system 120, so that in a multi-window environment, the projected trajectory path of the cursor includes not just the originating application, but other functions such as the OS-level objects including menu bars and icons on the desktop.

FIG. 2 depicts a display screen 110 displaying a user interface (UI) 250, in accordance with embodiments of the present invention. The UI includes a first action-object, i.e., the circular menu 220a, a second action object, i.e., a pushbutton 220b, a third action object, i.e., a pushbutton 220c, and a fourth action object, i.e., a pushbutton 220d. While the UI 250 shows four action objects, the UI can include less than four or more than four action objects as designed for operation of the software application. The UI 250 includes a table with a plurality of rows and columns, as well as additional fields to a side of the table. As shown in the illustrated embodiment, a cursor 230 is represented in display screen 110 within the UI 250. The cursor 230 is shown as a conventional arrow design, but can be any shape, color, design, etc.

Figure 3:
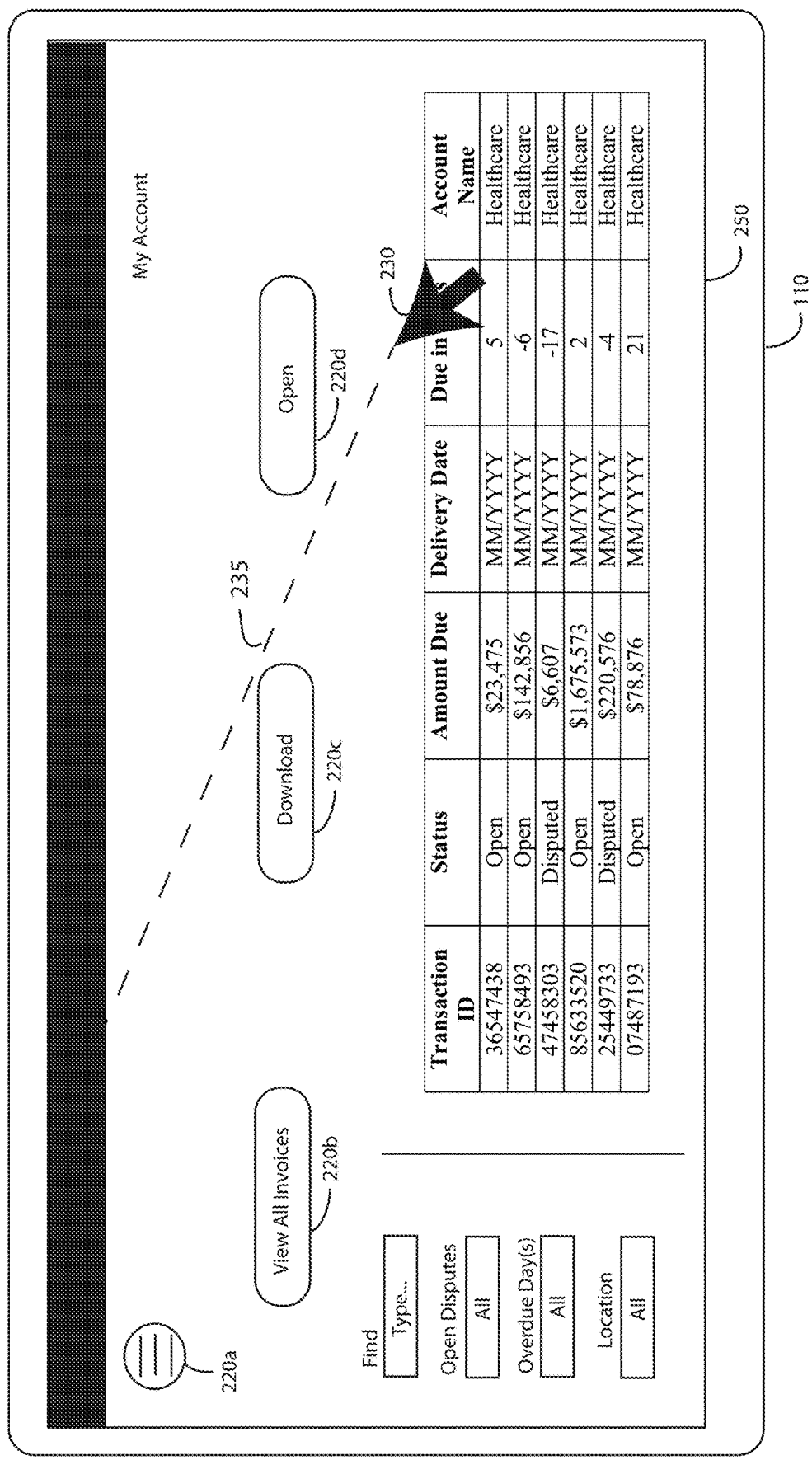
FIG. 3 depicts a calculated trajectory path measured from a cursor as it points to empty space, in accordance with embodiments of the present invention.

FIG. 3 depicts a calculated trajectory path 235 measured from a cursor 230, in accordance with embodiments of the present invention. The trajectory path 235 is shown in the drawings as a dashed line but is not required to be visible to the user or graphically displayed by the UI 250. In the illustrated embodiment, the calculation module 131 calculated a trajectory path 235 from a point on the cursor 230 measured at approximately a 135° angle, which extends up and to the left of the cursor 230 until the path reaches a boundary or edge of the UI 250. The trajectory path 235 is calculated in response to a user pressing and holding a button of a mouse at a point on the UI 250 and moving the cursor where there is no object to drag or select. The calculated trajectory path 235 remains plotted across the UI 250 for as long as the user holds the button of the mouse and moves the cursor in a specific direction. Similarly, the trajectory path 235 is calculated in response to a user pressing down with the user's finger on a touchscreen at a point on the UI 250 where there is no object to drag or select and moving the cursor in a specific direction. The calculated trajectory path 235 remains plotted across the UI 250 for as long as the user keeps the user's finger pressed against the touchscreen of the display screen 110. In both examples, the cursor 230 represents a location on the UI 250 where the user has either clicked and held a mouse button or pressed on the touchscreen. While FIG. 3 depicts the cursor 230 as a conventional arrow graphic, the cursor 230 also represents a location of the user's finger on the touchscreen, which in some cases does not result in a graphical representation on the touchscreen display.

The detection module 132 includes one or more components of hardware and/or software program code for detecting that at least a portion of an action object intersects the trajectory path of the cursor as a result of a second input of the input mechanism. For instance, the detection module 132 determines whether any action objects are located in the path of the trajectory path measured from the cursor. In FIG. 3, no action object is located in the projected trajectory path 235, and thus the detection module 132 determines that no action objects intersect with the trajectory path 253. However, as a result of a second input from the input mechanism 111, such as a short movement of a mouse by the user, or a short drag of the user's finger, the cursor can be relocated such that an action object is now detected in the trajectory path of the cursor. The detection module 132 detects that an action object intersects with the trajectory path. FIG. 4 depicts an action object detected in the calculated trajectory path, in accordance with embodiments of the present invention. In the illustrated embodiment, the cursor has been moved towards the pushbutton from the cursor position in FIG. 3. The change in cursor direction results in a new trajectory path 235' plotted across the UI 250. In an exemplary embodiment, the trajectory path 235' keeps the same angle with respect to the cursor as the initially calculated trajectory path 235. The detection module 132 detects that the new trajectory path 235' intersects with action object 220c of the UI. By moving the mouse a very short distance on a work surface in a real-world setting, or sliding the user's finger a very short distance across the display screen 110, the user is able to select an action object, such as action object 220c, which is located remote from the cursor 230. In other words, the user does not need to manipulate the input mechanism 111 so that the cursor 230 travels an entire distance on the UI 250 from a staring cursor position to a location of the action object 220c. Rather, the user need only move the cursor slightly in a specific direction so that the trajectory path 235' intersects or otherwise touches the action object 220c.

Figure 5:
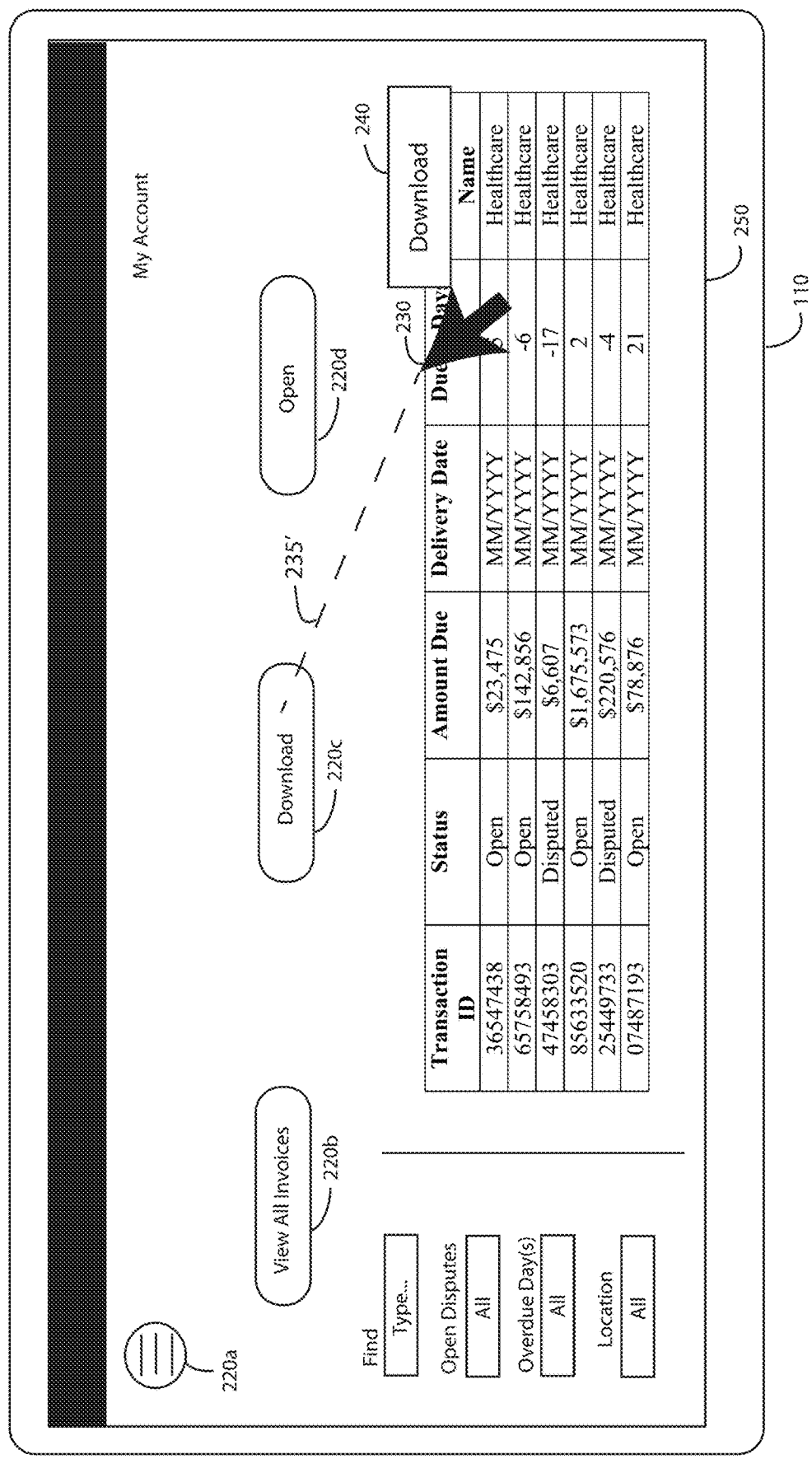
FIG. 5. depicts the UI of FIG. 4 being augmented to present an action menu object relating to an action-object ("Download"), in accordance with embodiments of the present invention.

The augmentation module 133 of the computing system 120 includes one or more components of hardware and/or software program code for augmenting the user interface 250. The UI 250 is augmented by presenting an action menu proximate the cursor as a function of the detecting that the trajectory path intersects with an action object. The action menu includes a listing of one or more actions associated with the action object. By way of example, the user can manipulate the cursor so that a trajectory path 235 passes through or otherwise intersects with an action object of a UI to prompt the action menu associated with the action object to pop-up proximate the cursor, without needing to move the cursor all the way over to the desired action object. FIG. 5 depicts the UI 250 of FIG. 4 being augmented to present an action menu object relating to an action object, in accordance with embodiments of the present invention. In the illustrated embodiment, the trajectory path 235' intersects action object 220c, and thus the action menu 240 is presented on the Iii next to the cursor. The action menu 240 includes an action that can be taken by the user (i.e. "Download"). The action can be taken by the user by manipulating the input mechanism 111 to position the cursor over the action menu 240 and releasing the button held down to initiate the routine or to remove the user's finger from the touchscreen. However, even if the computing system 120 detects that an action object intersects with the trajectory path, the user may intend on selecting a different action object of the UI. The user's intent to select a different action item is made known by subsequent manipulation or operation of the input mechanism 111.

Figure 6:
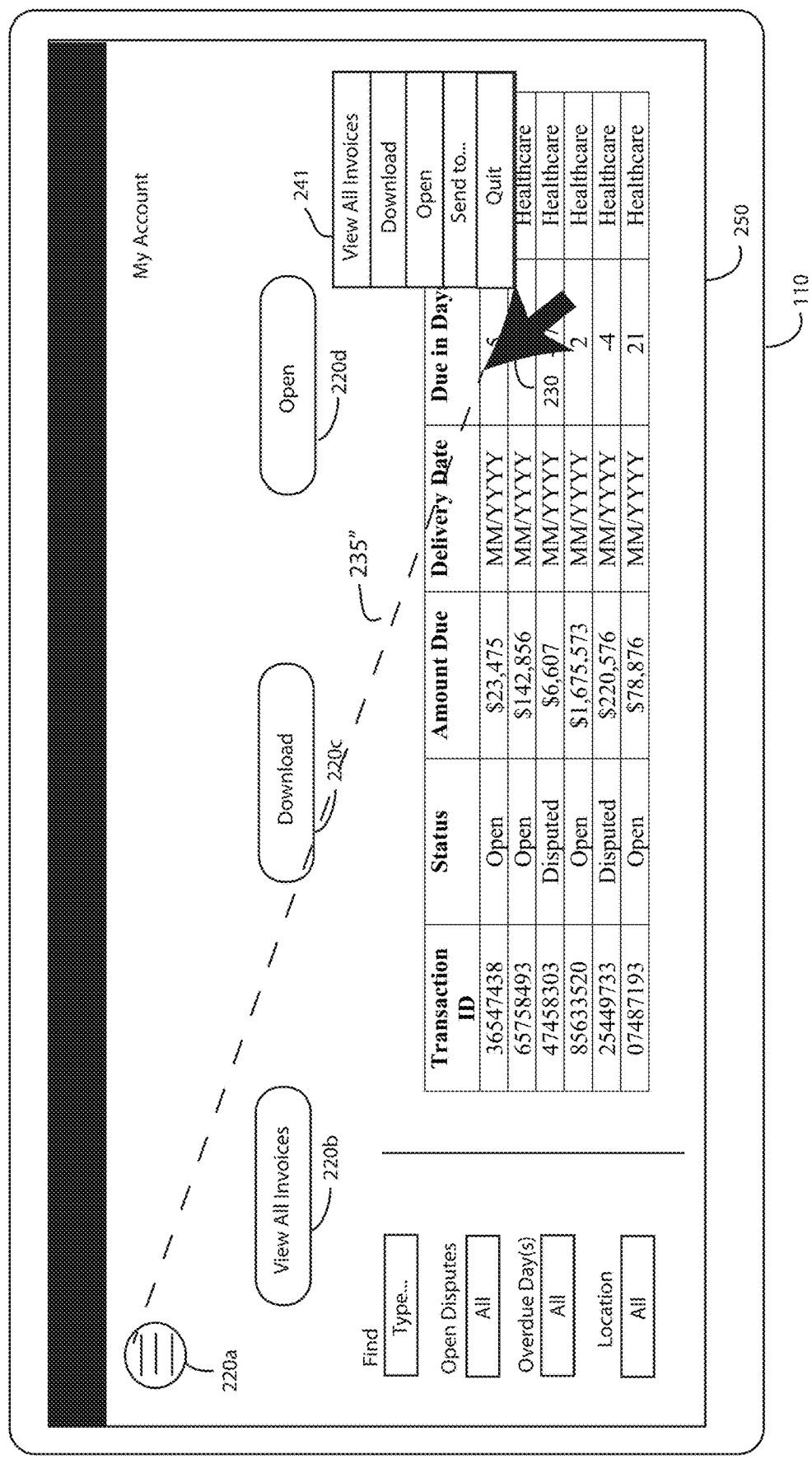
FIG. 6 depicts the UI of FIG. 5 being augmented to present another action menu relating to an action-object (i.e. the contents of the circular menu symbol), in accordance with embodiments of the present invention.

Accordingly, the augmentation module 133 removes the action menu 240 from the user interface 250, in response to a third input from the input mechanism 155. If subsequent input is received associated with a further movement of the mouse or further swiping gestures of the user's finger across the touchscreen, the augmentation module 133 determines that the user does not intend or no longer wishes to view the action item menu that popped after detection that the action object was in the line of the trajectory path. The subsequent movement of the cursor also triggers the detection module 132 to further scan and detect or to continue scanning and detecting any intersections between the trajectory path and an action object located on the UI. Because of the trajectory path extending from the cursor, action objects can be reached that are remote from the cursor with reduced travel time and shortened physical travel distances. In response to a new detection of an intersection between an action object and the trajectory path, the augmentation module 133 generates a new action menu proximate the cursor as a function of detecting a subsequent action object of the user interface. The new action menu includes a listing of one or more actions associated with the new action object. By way of example, the user can manipulate the cursor so that a trajectory path passes through or otherwise intersects with a subsequent action object of a UI to prompt the new action menu associated with the action object to pop-up proximate the cursor, without needing to move the cursor all the way over to the desired action object. FIG. 6 depicts the UI 250 of FIG. 5 being augmented to present a new action menu 241 relating to an action object 220a, in accordance with embodiments of the present invention. In the illustrated embodiment, the trajectory path 235" intersects action object 220a, and thus the action menu 241 is presented on the UI next to the cursor. The action menu 241 includes actions that can be taken by the user (i.e. "View All Invoices", "Download", "Open", "Send to . . . ", "Quit"). The actions can be taken by the user by manipulating the input mechanism 111 to position the cursor over the specific action in the action menu 241 and releasing the button held down to initiate the routine or to remove the user's finger from the touchscreen.

Figure 7:
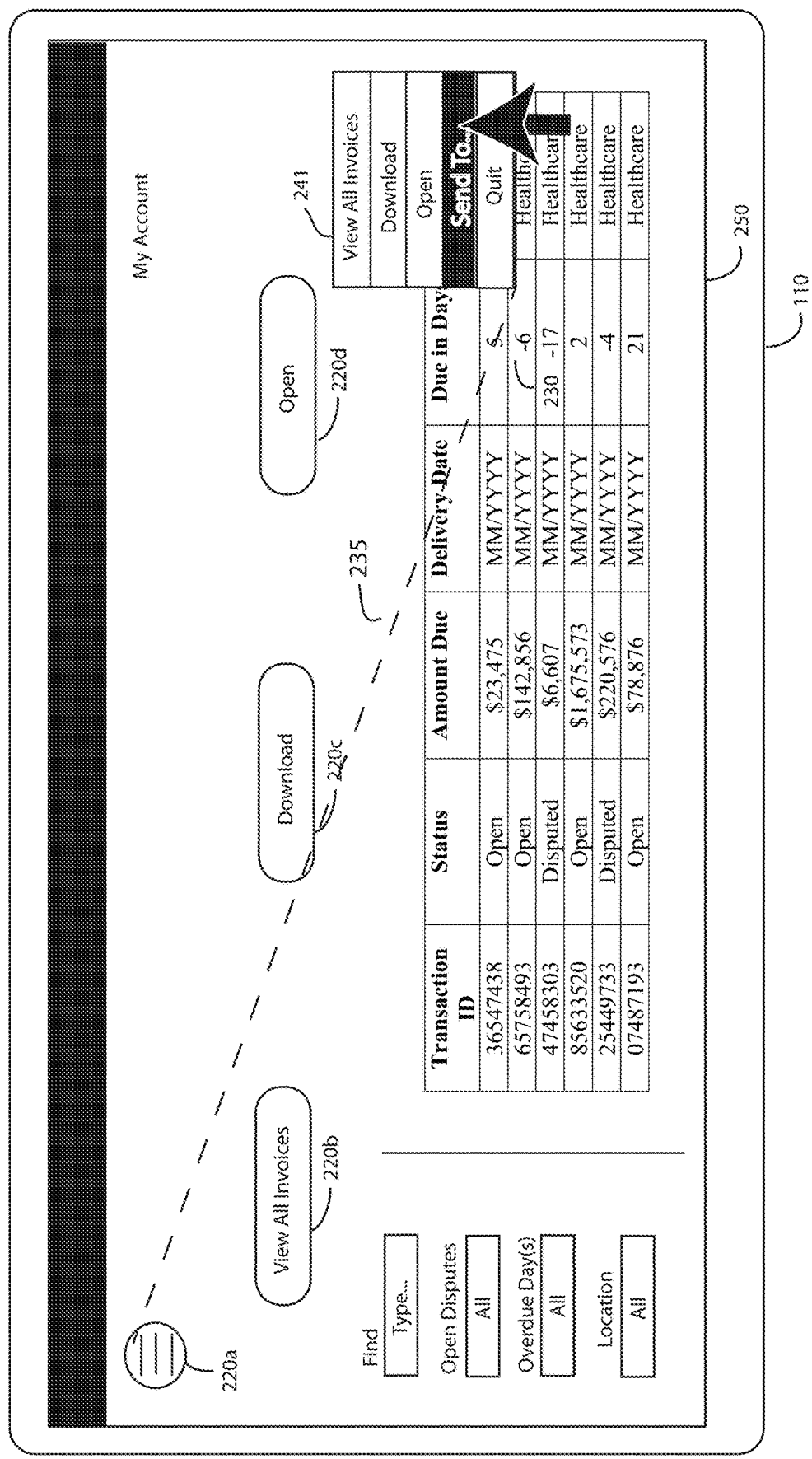
FIG. 7 depicts the UI of FIG. 6 in response to the cursor being repositioned within the action menu to the "Send to . . . " selection, in accordance with embodiments of the present invention.
Figure 8:
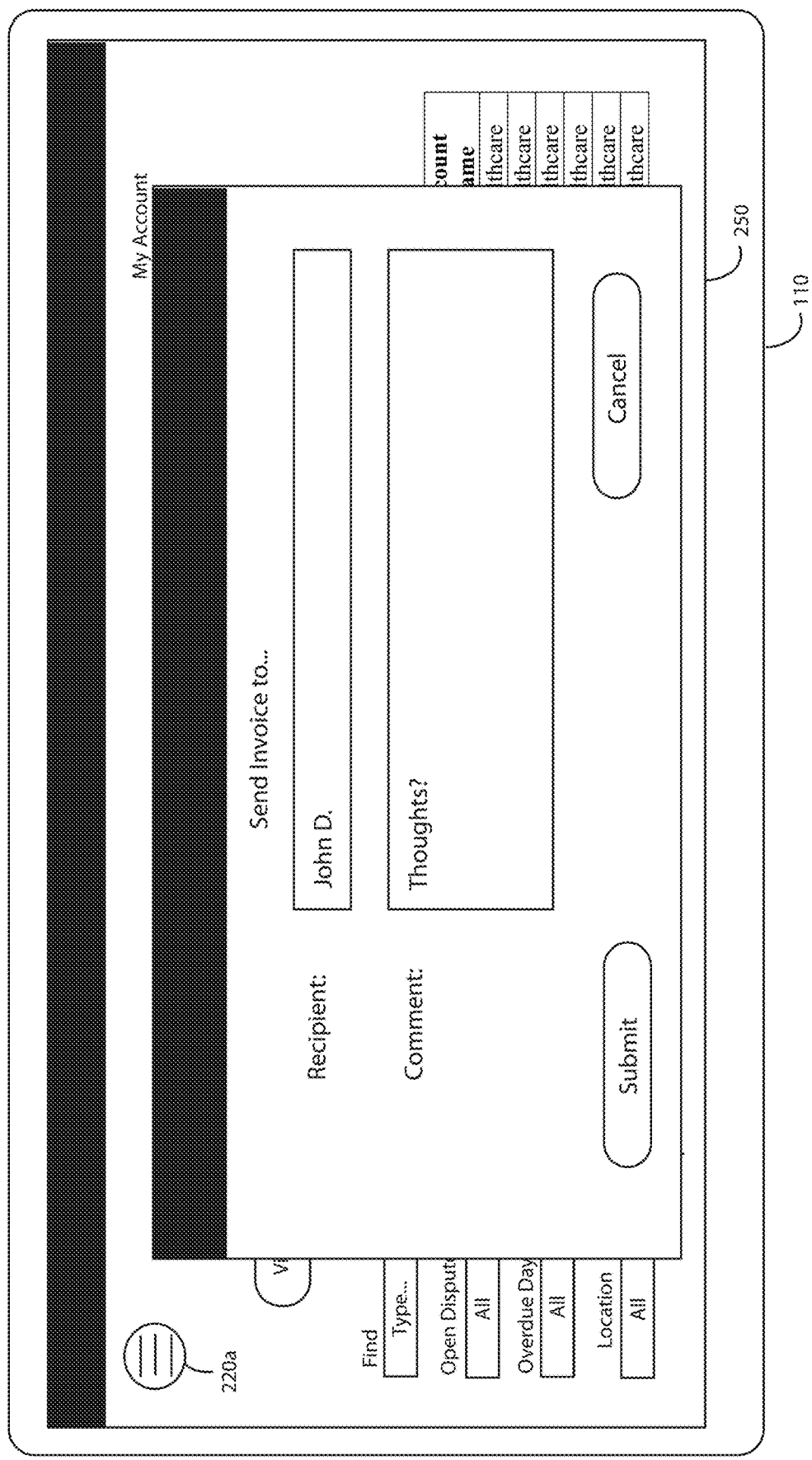
FIG. 8 depicts the UI of FIG. 7 showing a pop up dialog box in response to an action selected to be performed, in accordance with embodiments of the present invention.

The action module 134 includes one or more components of hardware and/or software program code for performing an action selected from the new action menu. The performing of the selected action is done in response to a fourth input from the input mechanism 111. For example, if the user desires to perform one of the actions in an action menu, the user repositions the cursor to hover over the desired action. In an exemplary embodiment, the cursor changes color and/or shape to indicate that an action can be selected. The user releases the button of the mouse or removes the user's finger from the touchscreen and the action can be performed. FIG. 7 depicts the UI of FIG. 6 in response to the cursor being repositioned within the action menu, in accordance with embodiments of the present invention. As shown in the illustrated embodiment, the action selected by the cursor has a different color/shading, than the other actions; the cursor color/shading has changed as well as a visual indicator to the user that the user has the option to perform the action. FIG. 8 depicts the UI of FIG. 7 in response to an action selected to be performed, in accordance with embodiments of the present invention. As shown in the illustrated embodiment, the UI 250 has been augmented or otherwise modified to include a new window showing the action being performed (e.g. "send invoice to"). To initiate the performance of the action, the user can release the mouse button that has been held down since the initiation of the calculation of the trajectory path. Similarly, the user can remove the user's finger from the touchscreen which has remained pressed against the touchscreen since the initiation of the calculation of the trajectory path.

Many different gestures and button presses can be incorporated into the action selection system 100. For instance, to initiate the calculating of the trajectory path, the user can press and hold the left mouse button, or can press and hold a finger to the touchscreen, as described above. However, other buttons or button press sequences can be used to initiate the action selection system 100 and control/select action objects on the UI of the display screen 110. As an example, instead of pressing and holding the left mouse button as a drag function until released to perform an action from the pop-up action menu, there could be a dedicated button on the mouse that when pressed initiates the action selection system 100. In another example, the user can double-click another button on the mouse or double-click the touchscreen of the display screen 110 to initiate the action selection system 100. The user can control the action selection system 100 with voice commands or other physical gestures to a camera coupled to the computing system 120.

Figure 9:
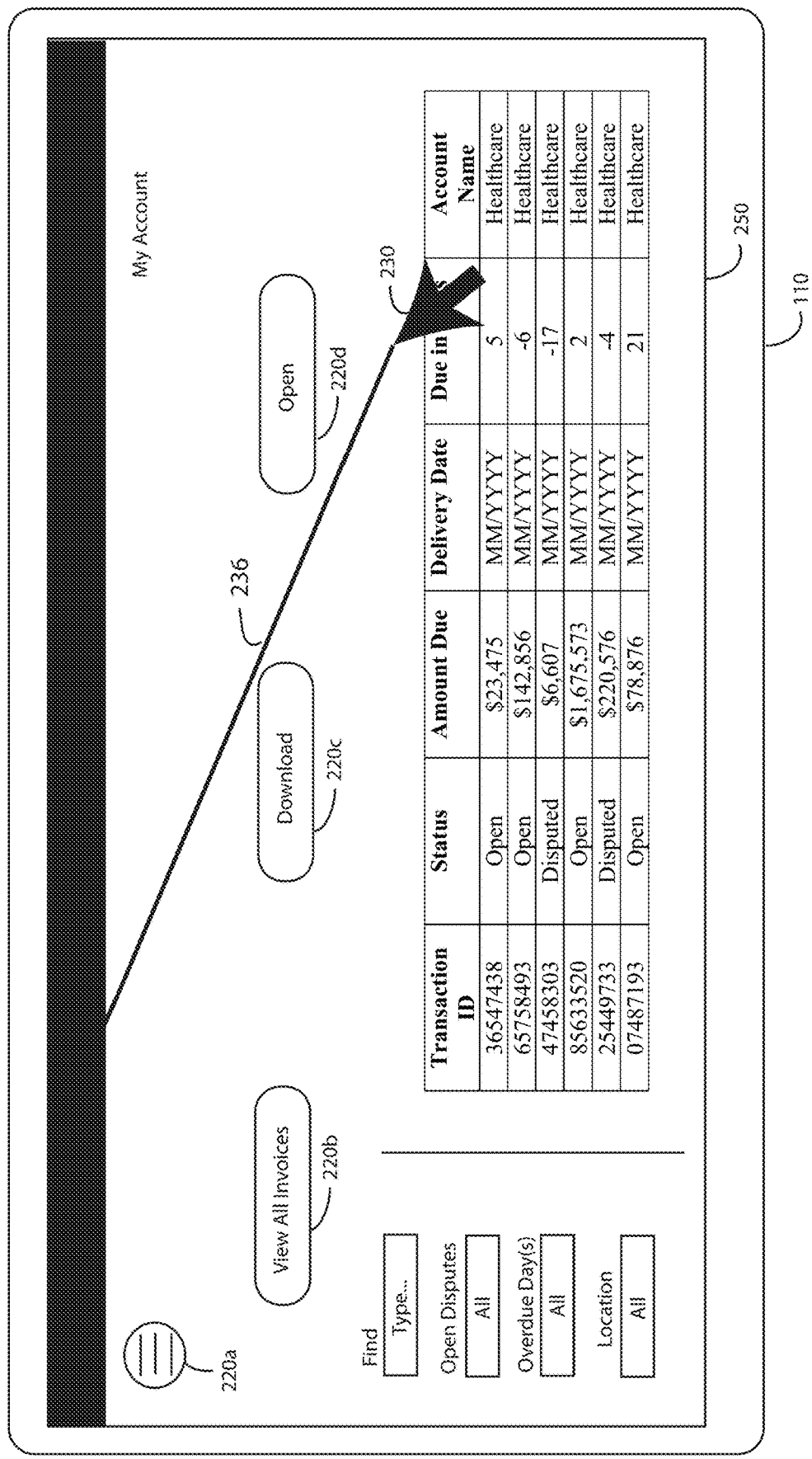
FIG. 9 depicts a UI having a superimposed trajectory path measured from the direction the cursor moved, in accordance with embodiments of the present invention.

Furthermore, the computing system 120 optionally superimposes the trajectory path on the display screen 110 so that the UI is augmented to visibly display the trajectory path on the display screen 110. A superimposed trajectory path can visually assist the user in selecting action objects with the trajectory path. FIG. 9 depicts a UI having a superimposed trajectory path 236 measured from the cursor, in accordance with embodiments of the present invention. The superimposed trajectory path 236 is calculated the same as the trajectory paths 235, 235', 235" but is visible to the user on the UI 250. The UI 250 of the display screen 110 is thus further augmented to improve the efficiency of UI navigation.

Moreover, in an optional and alternative embodiment, the trajectory of the trajectory path measured from the cursor can be adjusted. In particular, the computing system 120 can adjust a direction of the trajectory path based on: a number of action objects located of the user interface in a sector of the display screen 110 and a current position of the cursor on the display screen 110. For example, the computing system 120 divides the UI into sectors, maps the UI for action objects, and determines a number of action objects within a sector of the UI. The UI includes a plurality of sectors. In an example embodiment, the UI includes four quadrants, wherein each quadrant is considered a sector of the UI. In the four quadrant UI example, the computing system 120 maps the UI and determines that a majority of action objects are located in the second quadrant (e.g. upper right sector) and the cursor is in the fourth quadrant (e.g. lower left corner of UI). As a result, the computing system 120 adjusts, modifies, or otherwise changes the trajectory path from a default trajectory path calculated based on a pre-defined angle to an adjusted trajectory path (e.g. +45° from +135° angle) that takes into consideration where the most action objects are and where the cursor is currently located. If the cursor is located in the top most corner of the UI and the majority of action objects are located in the second quadrant, the computing system 120 adjusts the trajectory path to a different angle, such as −135° angle.

Figure 10:
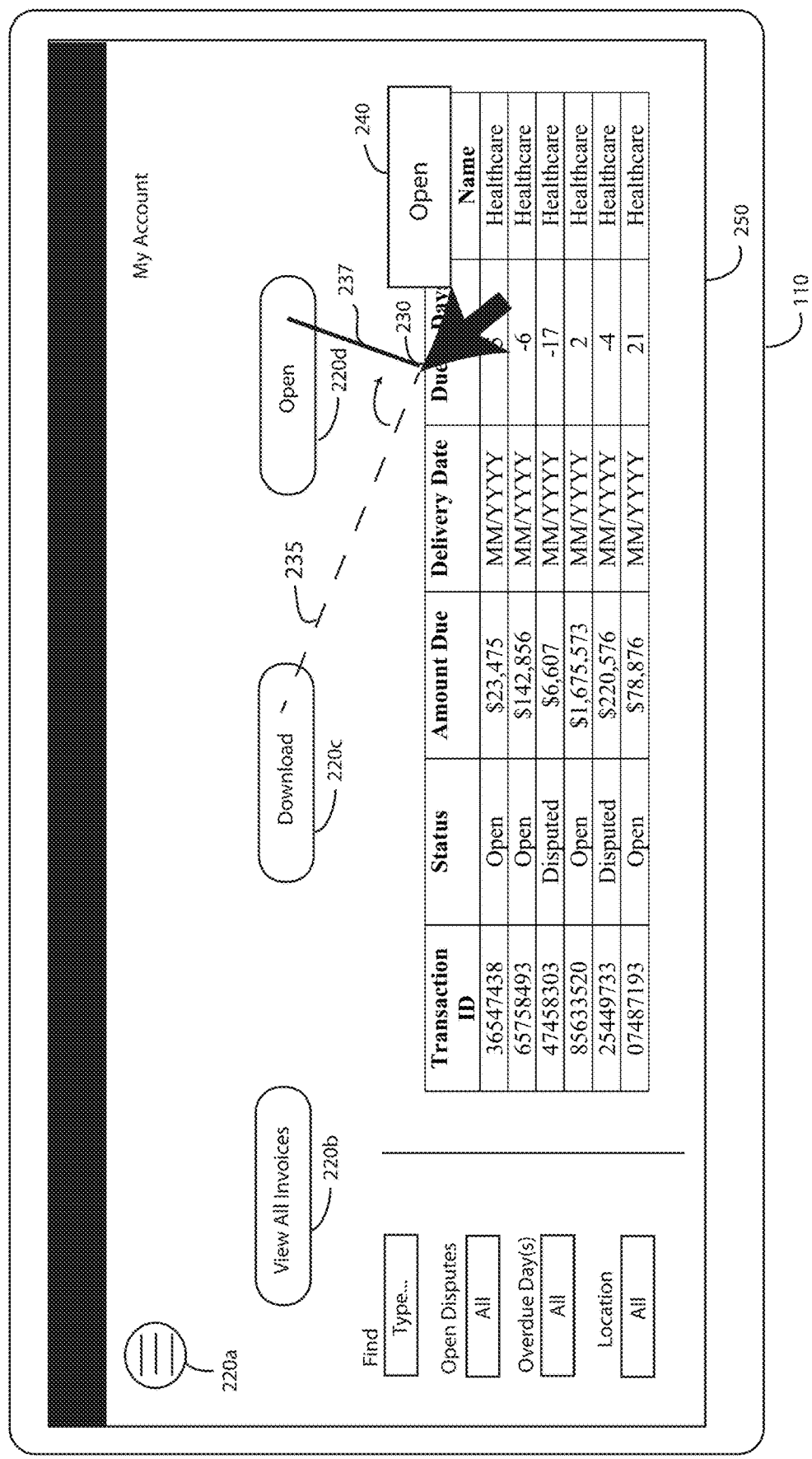
FIG. 10 depicts an adjusted trajectory path as the cursor moves towards the "Open" pushbutton, in accordance with embodiments of the present invention.

In an optional and alternative embodiment, the computing system 120 can also adjust a direction of the trajectory path based on an input received from the input mechanism 11. For example, a user command is used to adjust the direction of the trajectory path by toggling between various fixed angles with respect to the cursor. Examples of a user command can be a pressing of a dedicated button, a voice command, a gesture on the touchscreen, a sequence of buttons pressed or keyboard shortcuts, and the like. FIG. 10 depicts an adjusted trajectory path, in accordance with embodiments of the present invention. In the illustrated embodiment, the initial trajectory path 235 is calculated but is then adjusted to include a new angle measured from the cursor 230. The adjustment of the trajectory path starting angle changes direction of the trajectory path to more efficiently select action objects depending on the current location of the cursor.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Accordingly, embodiments of the action selection system 100 improves UI navigation, improves the functioning of peripheral devices, expands of gestures for navigating the UI, reduces a physical effort of the user to select action objects, and increases the speed in which an action object can be selected from even the most distant locations on the screen. The user does not have to move the mouse very far to get what they want. The action selection system 100 maps out the entire screen to ensure situational awareness of where all LI objects are located on the screen and knows which actions are associated with each object. Further, the action selection system 120 can be used or not used depending on a speed of the mouse being used or speed of fingers swiping on the touchscreen. If the user moves the cursor directly to an object and clicks on the object, then the action selection system may not be engaged. But if the user moves the mouse slowly, then the cursor shows a thin line to the first object along with the object's actions. If the user ignores that and continues moving in that direction, the next object on the other side of the first object relative to the cursor, is selected and the next object's actions are shown. By using a drag action where there are no objects to drag, the direction of the mouse offers the user a map, from which the user can choose actions without having to move to that specific location.

Moreover, the action selection system 100 is a technical solution to technical problems. For example, the action selection system 100 solves problems relating to moving a mouse long distances, for example, having to pick the physical mouse up and return the mouse to an original location because the user ran out of space moving the mouse on the desk surface. In an optional and alternative embodiment, the action selection system 100 also improves the readability of action menus within UI that are otherwise difficult to read. In particular, conventionally clicking on menus such as File, Edit, View, then moving down to select an action in the list can be difficult, but the action selection system 100 displays an enlarged version of the menu to make precise mouse movements less demanding. In addition, the action selection system 100 creates a new user feel and experience for this type of control. The user can re-adjust to the restricted proprioceptive space and generate a map in the brain that focuses on the actions available and the directions they are located, as opposed to the standard visual presentation of boxes, lines, pushbuttons, and icons located in a rectangle that is the application. The action selection system also reduces a number of times a user has to click a mouse or tap a screen.

Currently, a user cannot reach distant actions by gesturing with the cursor. Embodiments of the action selection system 100 allows a user to access actions without having to move to the location where the action is located. As described above, embodiments of the action selection system 100 save the user from moving a mouse or finger to a distant location. The user can access the actions quicker. If the pop-up menus are made larger, then the user with fine motor control issues can access actions easier.

Figure 11:
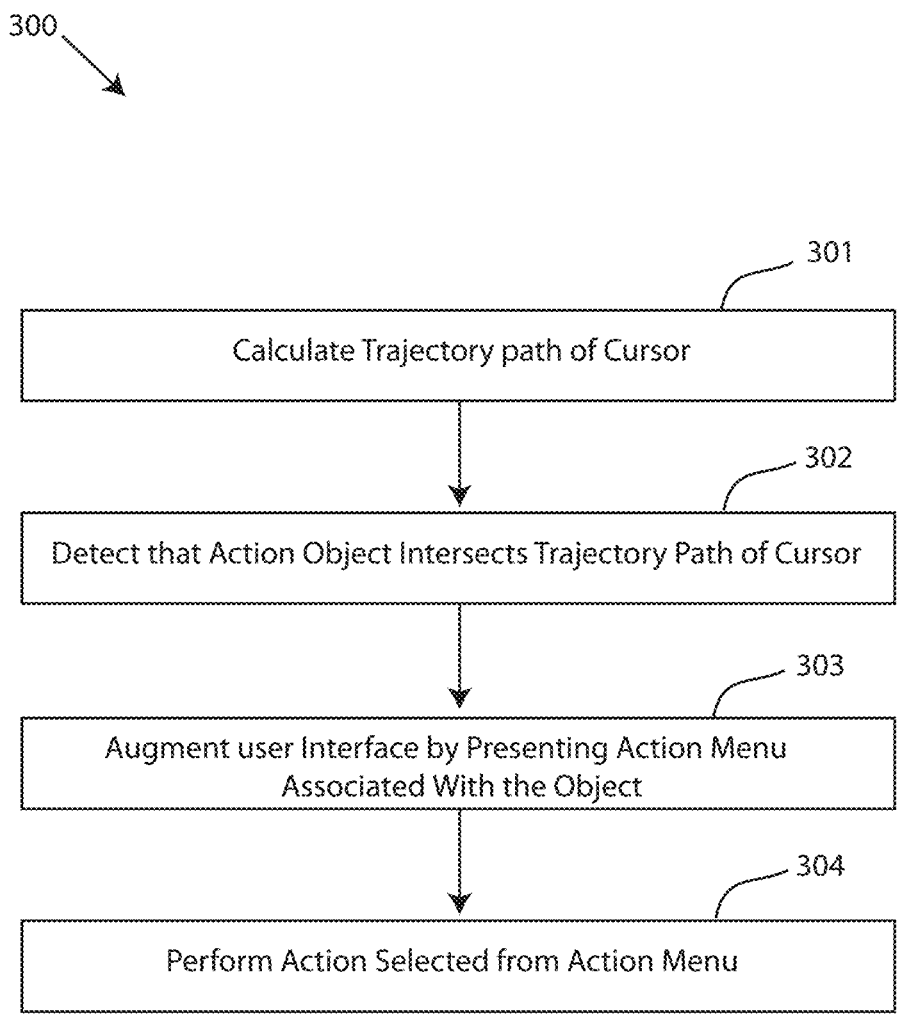
FIG. 11 depicts a flow chart of a method for selecting actions of a user interface using cursor gestures, in accordance with embodiments of the present invention.

Referring now to FIG. 11, which depicts a flow chart of a method 300 for remotely selecting actions of a user interface using cursor gestures, in accordance with embodiments of the present invention. One embodiment of a method 300 or algorithm that may be implemented for remotely selecting actions of a user interface using cursor gestures with the action selection system 100 described in FIGS. 1-10 using one or more computer systems as defined generically in FIG. 13 below and more specifically by the specific embodiments of FIG. 1.

Embodiments of the method 300 for remotely selecting actions of a user interface using cursor gestures, in accordance with embodiments of the present invention, may begin at step 301 wherein step 301 calculates a trajectory path of a cursor. Step 302 detects that an action object intersects the trajectory path of the cursor. Step 303 augments the user interface by presenting an action menu associated with the object. Step 304 performs the action selected from the action menu.

Figure 12:
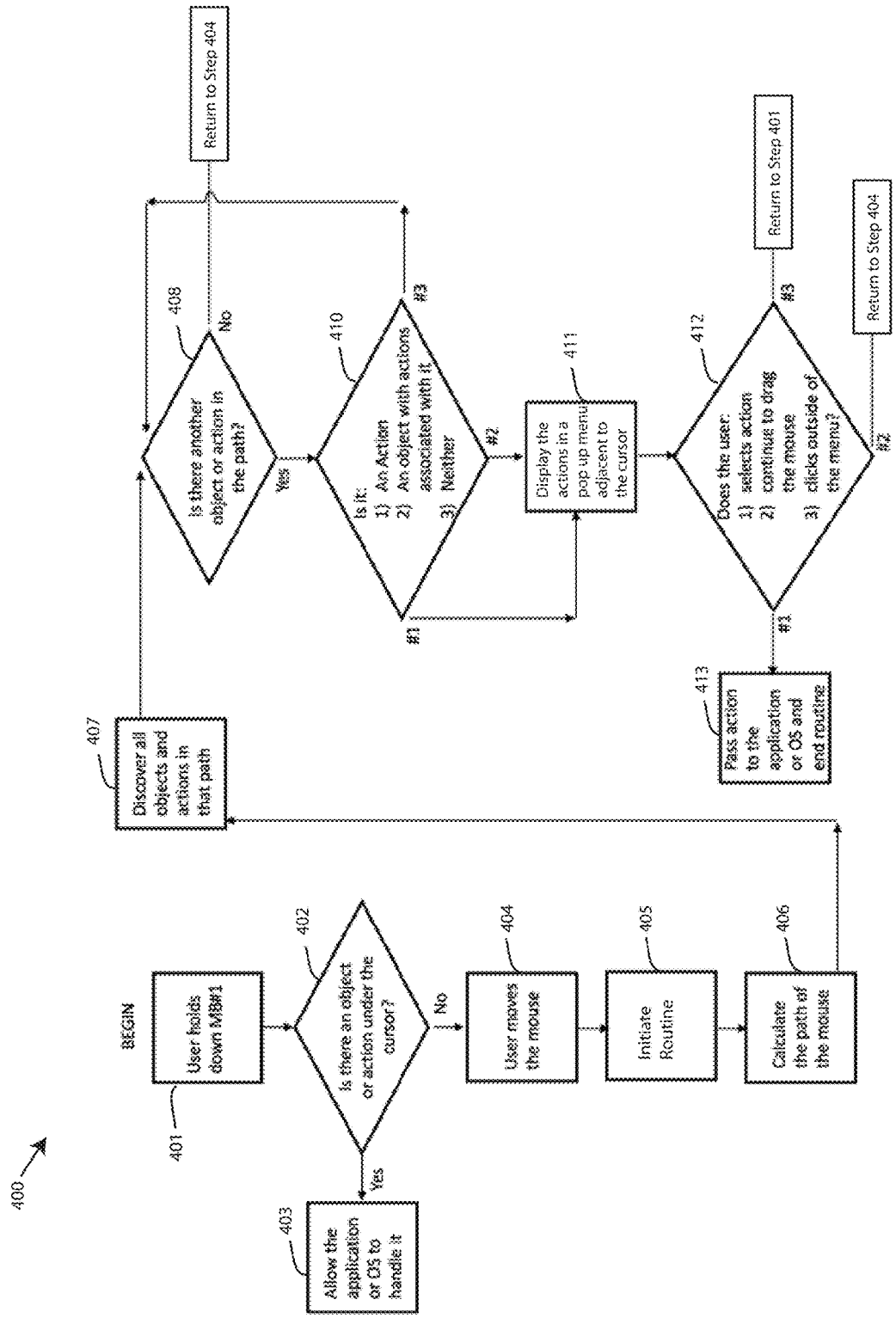
FIG. 12 depicts a detailed flow chart for selecting actions of a user interface using cursor gestures, in accordance with embodiments of the present invention.

FIG. 12 depicts a detailed flow chart of an embodiment of a method 400 for remotely selecting actions of a user interface using cursor gestures, in accordance with embodiments of the present invention. At step 401, the user holds down a button of a mouse or presses the touchscreen of a device. Step 402 determines whether there is an object or action under the cursor. If yes, the system allows the application or the operating system to handle the action. If no, then at step 404 the mouse is moved. Step 405 initiates the routine. Step 406 calculates the path of the mouse or user finger on the touchscreen. Step 407 discovers/maps all object and actions in the calculated path. Step 408 determines whether there is another object or action in the path.

If no, the method 400 returns to step 404. If yes, step 410 determines whether it is an action, an object with actions associated with the object, or neither. If it is an action or an object with associated actions, step 411 displays the action in a pop up menu. If it is neither, the routine returns to step 408. Step 412 determines whether the user selects the action, continues to drag the cursor, or clicks outside of the menu. If the user selects the action, step 413 passes the action to the application or the operating system and ends the routine. If the user continues to drag the cursor, then the routine returns to step 404. If the user clicks outside of the pop-up menu, then the routine returns to step 401.

Figure 13:
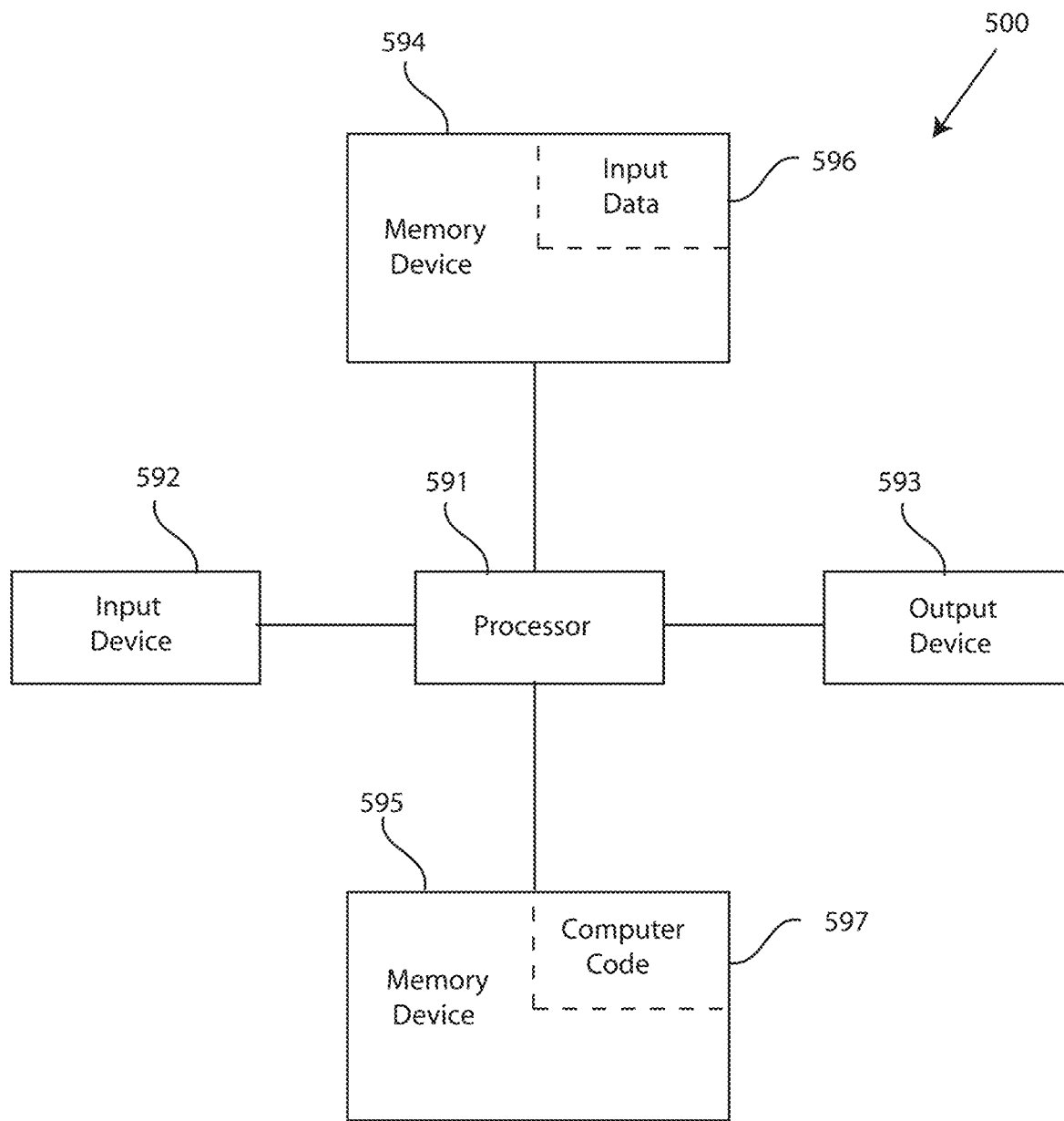
FIG. 13 depicts a block diagram of a computer system for an action selection system of FIGS. 1-10, capable of implementing a method for selecting actions of a user interface using cursor gestures of FIGS. 11-12, in accordance with embodiments of the present invention.

FIG. 13 depicts a block diagram of a computer system for the action selection system 100 of FIGS. 1-10, capable of implementing methods for remotely selecting actions of a user interface using cursor gestures of FIGS. 11-12, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for remotely selecting actions of a user interface using cursor gestures in the manner prescribed by the embodiments of FIGS. 11-12 using the action selection system 100 of FIGS. 1-10, wherein the instructions of the computer code 597 may be executed by processor 591 via memory device 595. The computer code 597 may include software or program instructions that may implement one or more algorithms for implementing the method for remotely selecting actions of a user interface using cursor gestures, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN) Further, memory devices 594, 595 may include an operating system (not shown) and may include other systems not shown in FIG. 13.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to remotely selecting actions of a user interface using cursor gestures. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to remotely select actions of a user interface using cursor gestures. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for remotely selecting actions of a user interface using cursor gestures. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for remotely selecting actions of a user interface using cursor gestures.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location as a higher level of abstraction (e.g., country, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
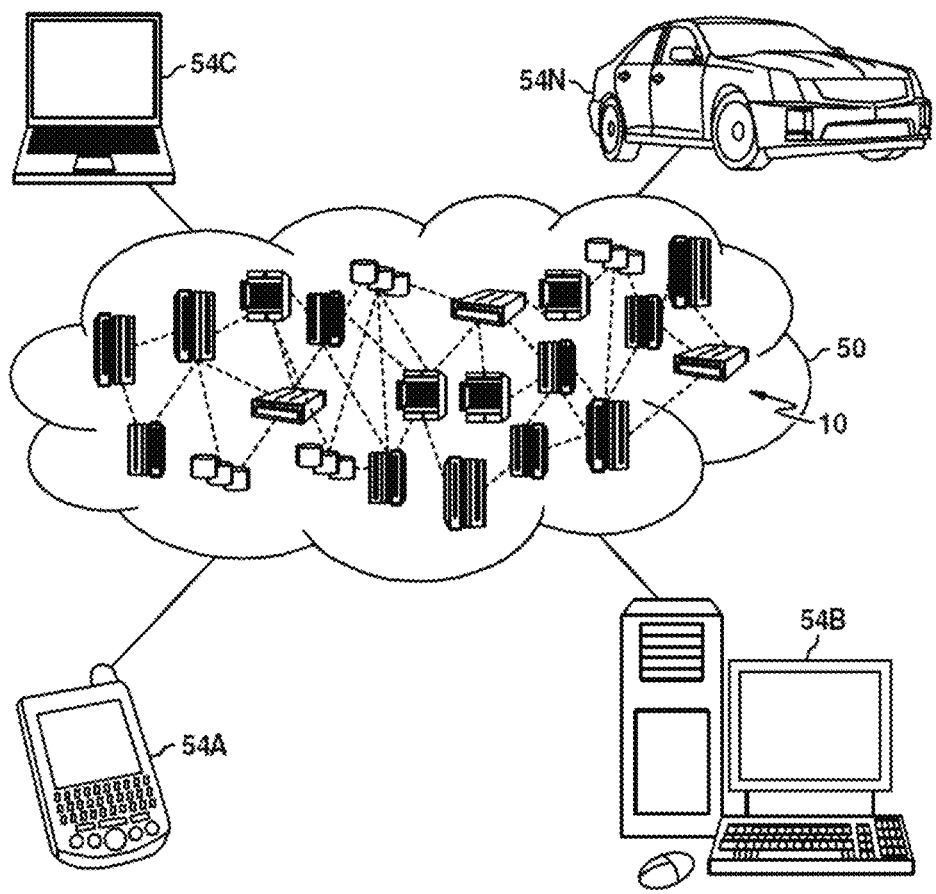
FIG. 14 depicts a cloud computing environment, in accordance with embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 13 are intended to be illustrative only and that computing nodes 10 and cloud computing environment 50 can communicate with any type of computerized device over any type of network and/or network addressable connection (e.g., using a web browser).

Figure 15:
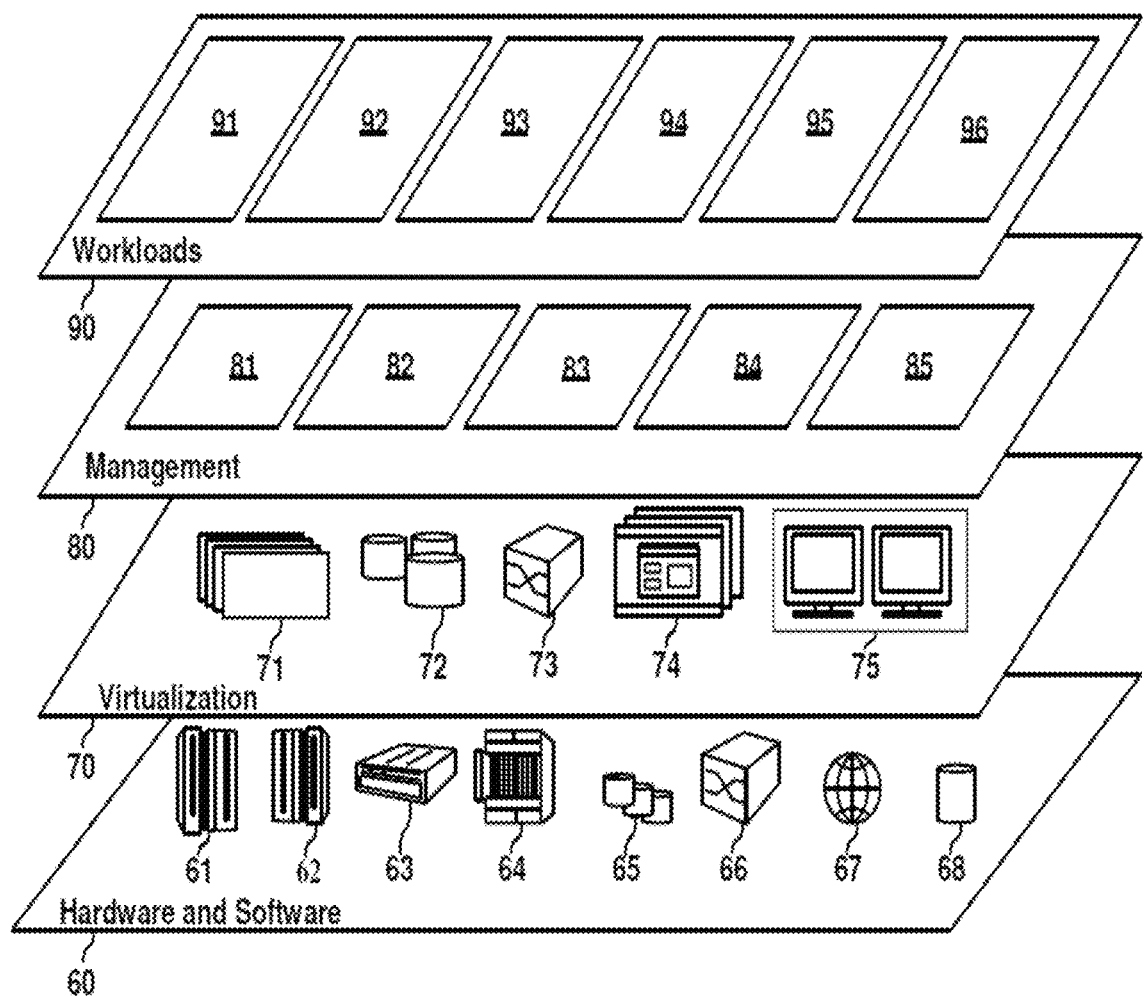
FIG. 15 depicts abstraction model layers, in accordance with embodiments of the present invention.

Referring now to FIG. 14, a set of functional abstraction layers provided by cloud computing environment 50 (see FIG. 13) are shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action selection within a UI 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for selecting actions in a user interface using cursor gestures, the method comprising:
    calculating, by a processor of a computing system, a trajectory path of a cursor digitally represented on the display screen using a current position and a direction of the cursor, the trajectory path of the cursor having an initial angle with respect to the cursor, wherein the calculating is initiated in response to receiving a first input from an input mechanism;
    maintaining, by the processor, the initial angle of the trajectory path with respect to the cursor in response to a second input from the input mechanism, the second input being a movement of the input mechanism from the current position;
    first detecting, by the processor, that at least a portion of a first action object intersects the trajectory path of the cursor as a result of the second input of the input mechanism;
    first augmenting, by the processor, the user interface by presenting a first action menu proximate the cursor as a function of the first detecting, the first action menu including one or more actions associated with the first action object;
    receiving, by the processor, a third input while the input mechanism is stationary;
    adjusting, by the processor trajectory path by a fixed angle with respect to the current position of the cursor, in response to receiving the third input from the input mechanism;
    second detecting, by the processor, that at least a portion of a second action object intersects the adjusted trajectory path of the cursor; and
    second augmenting, by the processor, the user interface by presenting a second action menu proximate the cursor as a function of the second detecting, the second action menu including one or more actions associated with the second action object.

2. The method of claim 1, further comprising: mapping, by the processor, the display screen to obtain locations of the action objects on the display screen.

3. The method of claim 1, further comprising: superimposing, by the processor, the trajectory path on the display screen so that the user interface is augmented to visibly display the trajectory path of the cursor on the display screen.

4. The method of claim 1, further comprising:
    removing, by the processor, the second action menu from the user interface, in response to detecting a new movement of the input mechanism; and
    generating, by the processor, a new action menu proximate the cursor as a function of detecting a subsequent action object of the user interface, the new action menu including one or more actions associated with the subsequent action object.

5. The method of claim 4, further comprising: performing, by the processor, an action selected from the new action menu.

6. The method of claim 1, wherein the first input is a press and hold of a first button on a mouse, the second input is a movement of the mouse, and the third input is a press of a second button of the mouse.

7. The method of claim 1, wherein the first action object is located remote from the cursor during the first detecting, such that the first action object is selectable from a distance remote from the cursor, thereby shortening a travel time of the input mechanism and reducing a physical path required by the input mechanism to select the first action object.

8. A computing system, comprising:
    a processor;
    a memory device coupled to the processor; and
    a computer readable storage device coupled to the processor, wherein the storage device contains program code executable by the processor via the memory device to implement a for selecting actions of a user interface using cursor gestures, the method comprising:
        calculating, by a processor of a computing system, a trajectory path of a cursor digitally represented on the display screen using a current position and a direction of the cursor, the trajectory path of the cursor having an initial angle with respect to the cursor, wherein the calculating is initiated in response to receiving a first input from an input mechanism;

maintaining, by the processor, the initial angle of the trajectory path with respect to the cursor in response to a second input from the input mechanism, the second input being a movement of the input mechanism from the current position;

first detecting, by the processor, that at least a portion of a first action object intersects the trajectory path of the cursor as a result of a second input of the input mechanism;

first augmenting, by the processor, the user interface by presenting a first action menu proximate the cursor as a function of the first detecting, the first action menu including one or more actions associated with the first action object;

while the input mechanism is stationary, adjusting, by the processor the trajectory path by a fixed angle with respect to the current position of the cursor, in response to receiving a third input from the input mechanism;

second detecting, by the processor, that at least a portion of a second action object intersects the adjusted trajectory path of the cursor; and second augmenting, by the processor, the user interface by presenting a second action menu proximate the cursor as a function of the second detecting, the second action menu including one or more actions associated with the second action object.

9. The computing system of claim 8, further comprising:
mapping, by the processor, the display screen to obtain locations of action objects on the display screen; and
superimposing, by the processor, the trajectory path on the display screen so that the user interface is augmented to visibly display the trajectory path of the cursor on the display screen.

10. The computing system of claim 8, further comprising:
removing, by the processor, the second action menu from the user interface, in response to detecting a new movement of the input mechanism;
generating, by the processor, a new action menu proximate the cursor as a function of detecting a subsequent action object of the user interface, the new action menu including one or more actions associated with the subsequent action object; and
performing, by the processor, an action selected from the new action menu, wherein the performing is done in response to a fourth input from the input mechanism.

11. The computing system of claim 10, wherein the first input is a press and hold of a first button on a mouse, the second input is a movement of the mouse, and the third input is a press of a second button of the mouse.

12. A computer program product, comprising a computer readable hardware storage device storing a computer readable program code, the computer readable program code comprising an algorithm that when executed by a computer processor of a computing system implements a method for selecting actions of a user interface using cursor gestures, the method comprising:

calculating, by a processor of a computing system, a trajectory path of a cursor digitally represented on the display screen using a current position and a direction of the cursor, the trajectory path of the cursor having an initial angle with respect to the cursor, wherein the calculating is initiated in response to receiving a first input from an input mechanism;

maintaining, by the processor, the initial angle of the trajectory path with respect to the cursor in response to a second input from the input mechanism, the second input being a movement of the input mechanism from the current position;

first detecting, by the processor, that at least a portion of a first action object intersects the trajectory path of the cursor as a result of a second input of the input mechanism;

first augmenting, by the processor, the user interface by presenting a first action menu proximate the cursor as a function of the first detecting, the first action menu including one or more actions associated with the first action object;

while the input mechanism is stationary, adjusting, by the processor the trajectory path by a fixed angle with respect to the current position of the cursor, in response to receiving a third input from the input mechanism;

second detecting, by the processor, that at least a portion of a second action object intersects the adjusted trajectory path of the cursor; and second augmenting, by the processor, the user interface by presenting a second action menu proximate the cursor as a function of the second detecting, the second action menu including one or more actions associated with the second action object.

13. The computer program product of claim 12, wherein the method further comprises:
mapping, by the processor, the display screen to obtain locations of action objects on the display screen;
superimposing, by the processor, the trajectory path on the display screen so that the user interface is augmented to visibly display the trajectory path on the display screen;
removing, by the processor, the second action menu from the user interface, in response to detecting a new movement of the input mechanism;
generating, by the processor, a new action menu proximate the cursor as a function of detecting a subsequent action object of the user interface, the new action menu including one or more actions associated with the subsequent action object; and
performing, by the processor, an action selected from the new action menu, wherein the performing is done in response to a fourth input from the input mechanism.

\* \* \* \* \*